No. 690,219. Patented Dec. 31, 1901.
A. ZEHDEN.
ELECTRICAL EQUIPMENT OF RAILWAY VEHICLES FOR THE PURPOSE OF
LIGHTING, HEATING, AND VENTILATION.
(Application filed July 14, 1900.)

(No Model.) 2 Sheets—Sheet 1.

WITNESSES:
C. Bradway
H. Guterbier

INVENTOR
Alfred Zehden
BY
Grace N. Wahle
ATTORNEYS

No. 690,219. Patented Dec. 31, 1901.
A. ZEHDEN.
ELECTRICAL EQUIPMENT OF RAILWAY VEHICLES FOR THE PURPOSE OF LIGHTING, HEATING, AND VENTILATION.
(Application filed July 14, 1900.)

(No Model.) 2 Sheets—Sheet 2.

WITNESSES:
Joseph H. Niles.
Henry Fuhrbier.

INVENTOR
Alfred Zehden
BY Foemer & Wahle
ATTORNEYS.

THE NORRIS PETERS CO., PHOTO-LITHO., WASHINGTON, D. C.

UNITED STATES PATENT OFFICE.

ALFRED ZEHDEN, OF CHARLOTTENBURG, GERMANY.

ELECTRICAL EQUIPMENT OF RAILWAY-VEHICLES FOR THE PURPOSE OF LIGHTING, HEATING, AND VENTILATION.

SPECIFICATION forming part of Letters Patent No. 690,219, dated December 31, 1901.

Application filed July 14, 1900. Serial No. 23,627. (No model.)

*To all whom it may concern:*

Be it known that I, ALFRED ZEHDEN, a citizen of the Empire of Germany, residing in Charlottenburg, in the Kingdom of Prussia and Empire of Germany, have invented certain new and useful Improvements in Means for the Electric Lighting of Railway-Cars, of which the following is a specification.

This invention relates to improvements in means for lighting railway-cars by electricity, each car being provided with a dynamo and storage battery, the dynamo being mounted on a shaft parallel with one of the car-axles and driven by the same by a suitable transmission device when the car is in motion, so as to supply the current. When the car is standing or its speed is below normal, the lamps or other lighting devices are fed from the storage battery; but when the car attains its normal speed the dynamo is automatically switched in by suitable mechanism, the action of which depends to some extent upon the degree to which the storage battery is charged and the resistance that is switched into the lamp-circuit. When the car attains greater than normal speed, the feed is maintained constant by means of a shunt-circuit or by equivalent means.

The invention consists, further, of certain devices for protecting the storage battery, so that after the same is fully charged it is automatically switched out of the circuit, also in means for protecting the collector, and other details of construction, which will be fully described hereinafter and finally pointed out in the claims.

Figure 1:
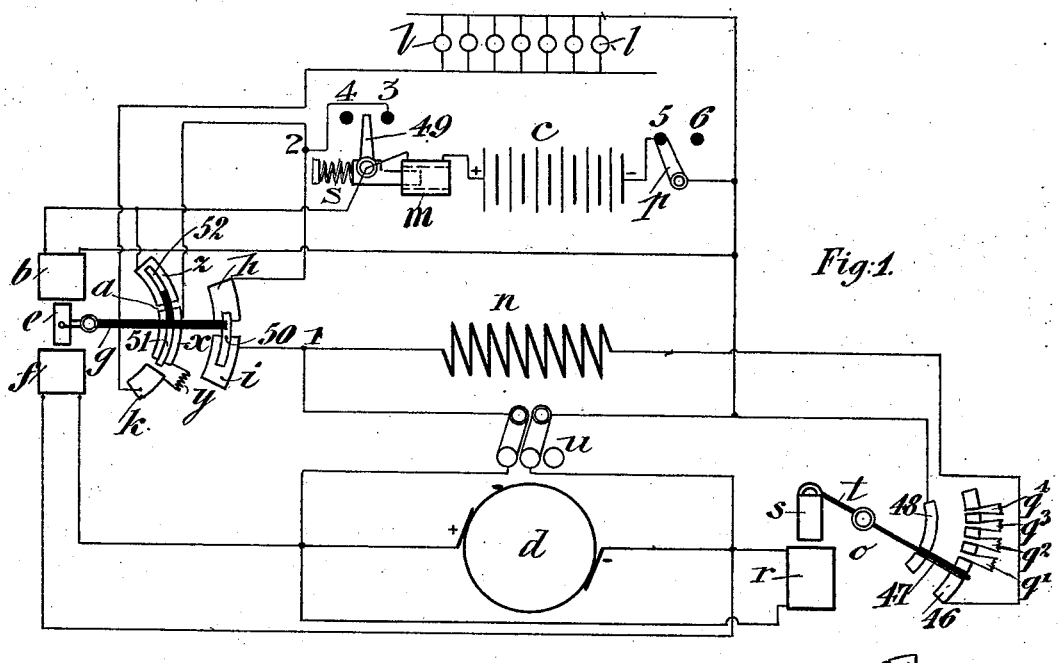
Figure 2:
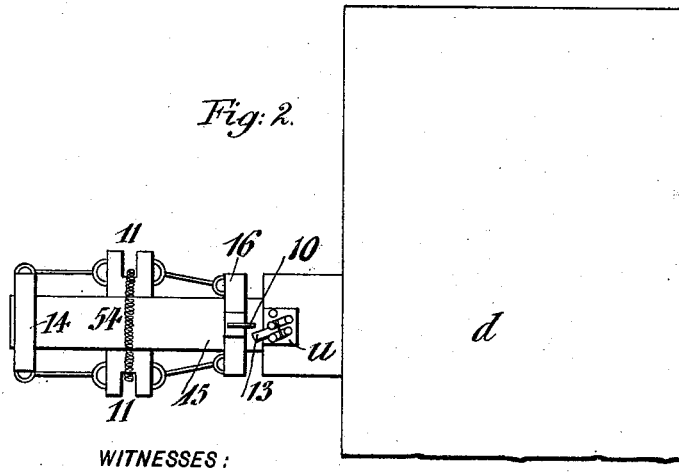
Figure 3:
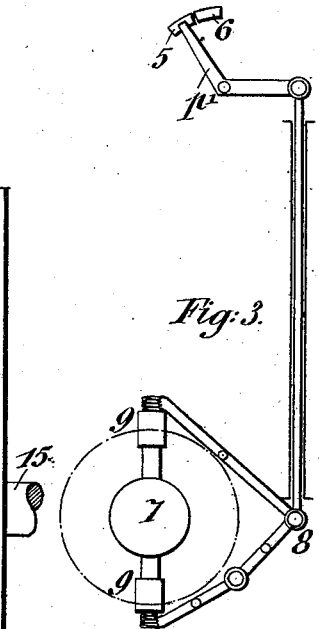
Figure 4:
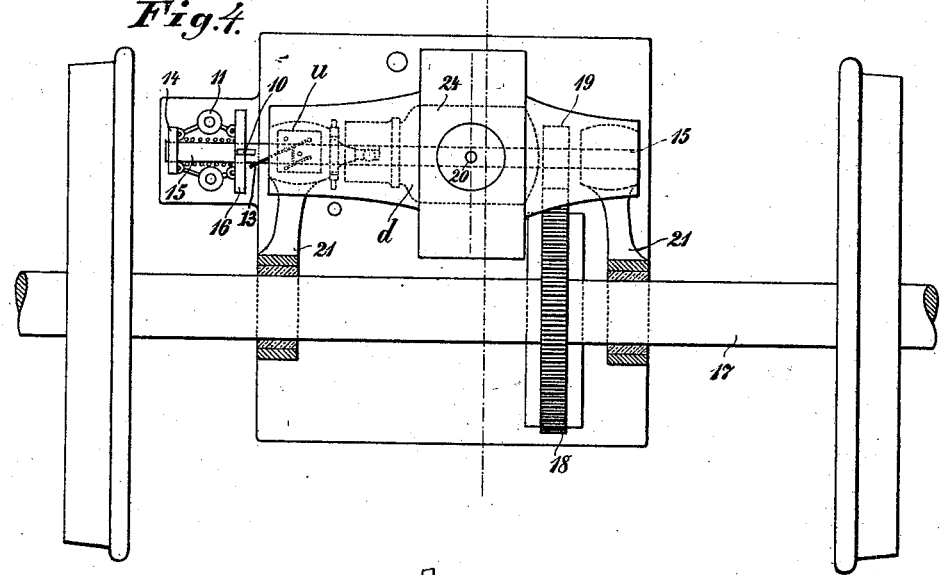
Figure 5:
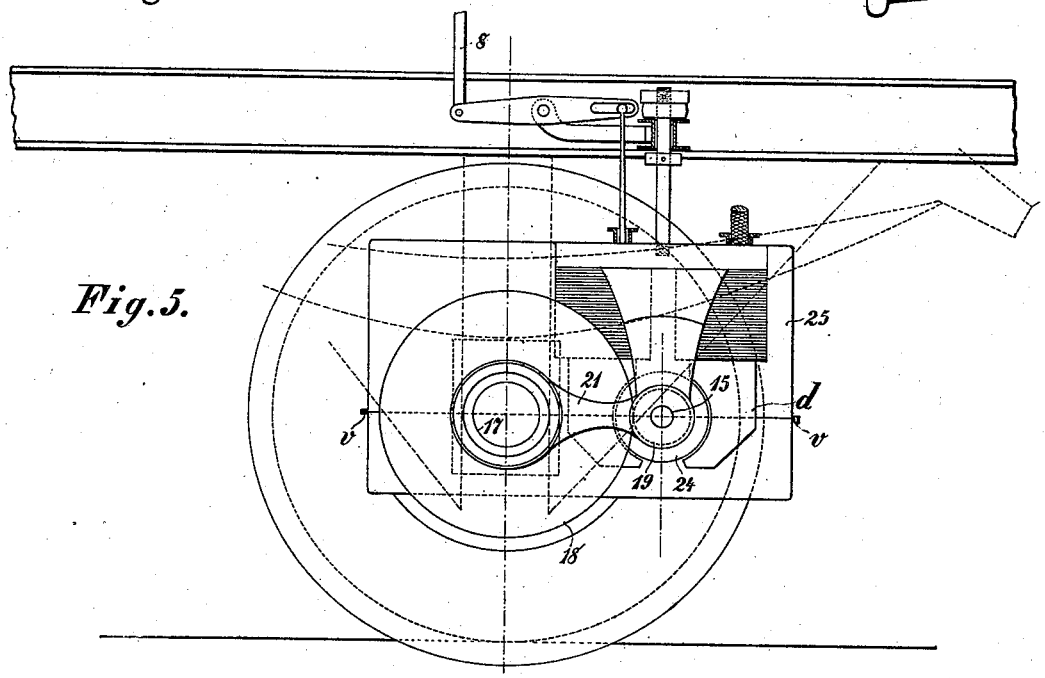

In the accompanying drawings, Figure 1 is a diagram showing the connection of the dynamo with the lighting-circuit with the devices for switching the storage battery in or out of the circuit and with the means for switching the collector in or out of the circuit. Fig. 2 is an elevation of the reversing-switch and the governing device for the same. Fig. 3 is a side elevation of the device for removing the brushes from the collector. Fig. 4 is a plan view of the truck-axle, showing the arrangement of the dynamo and the mechanism for transmitting motion from the car-axle. Fig. 5 is a side elevation of Fig. 4.

Similar characters of reference indicate corresponding parts.

Referring to the drawings, each car is provided with a separate dynamo $d$ and a storage battery $c$, which is located below the bottom of the car. The shaft 15 of the armature 24 of the dynamo is arranged parallel to the axle 17 of the car and is rotated by an intermediate transmitting-gear 18 19. The casing of the dynamo is suspended below the bottom of the car by a spring 20 in connection with the supporting-brackets 21, which are applied to the car-axle 17, as shown in Fig. 4, and which secure the proper distance between the axle and the armature-shaft 15. The dynamo is protected against dust and injury, together with its transmitting-gear, by its casing 25, the lower part of which can be opened at $v$.

When the car is standing still or when the speed is below normal, the storage battery $c$ supplies the current for the lighting devices $l$ and the heating and ventilating devices which are used. When the car attains its normal speed, the dynamo is switched in by electromagnetic action by simultaneously switching in a resistance between it and the lighting-circuit. When the car attains a greater speed than normal, the field of the dynamo is rendered constant by proper regulation. The storage battery is protected by devices that produce its automatic shunting, and devices are arranged for protecting the collecting-brushes, so that the same are not used during the day, when the lighting of the cars is not required.

My improved lighting apparatus for cars operates in the following manner: At one end of the car is arranged a switch device. The switch $a$, Fig. 1, is in the nature of a differential voltmeter and consists of two spools, with voltmeter winding, which act jointly on an iron core in opposite directions. The coil $b$ is placed in circuit with the storage battery $c$ and the coil $f$ with the brushes of the dynamo. They act jointly, but in opposite direction, on the iron core $e$, which is applied to the forked lever $g$. The opposite end of this lever glides over different contact-pieces, so that a connection between $k$ and $i$, respectively, $x$ and $z$, and a short-circuiting of the resistance $y$ between the contact-pieces $x$ and $k$ can be produced when the core $e$ is influenced in the proper way by the coil. When the train is at rest, the storage battery alone supplies the current, and the core $e$ is then attracted by the coil $b$.

As soon as the train is set in motion the coil $f$, which is connected with the dynamo, attracts the core $e$ gradually until it assumes, at normal speed, the position shown in Fig. 1. The lever $g$ now short-circuits the two contacts $k$ and $i$ and is moved away from the contact $k$. This produces the switching in of the dynamo, while the resistance $y$ is switched into the lamp-circuit, so that the course of the current is as follows: from the dynamo $d$ to the switch $u$ (referred to hereinafter) to the point 1. At this point the current is divided, one branch passing through the shunt $n$ and the regulating device $o$ of the same, while the other branch passes over $i$ and $h$ to the point 2, where it is again divided, the first branch current passing through the automatic switch $m$ to the storage battery $c$ and the main switch $p$, while the second branch passes over $x\ y\ k$ to the lamps $l$, after which the three currents unite in the switch and flow back to the poles of the dynamo. The course of the three currents is therefore, in detail, as follows:

First. For the storage battery: from the positive brush of the dynamo $d$ and the left-hand arm of the switch $u$ to the point 1, from here over points $i$ and $h$, which are connected by a piece 50, to the point 2, from this point over contact-point 3, (where the storage battery produces automatically the interruption of the current when it is fully charged, as is assumed in Fig. 1,) over contact-arm 49 of the core of the coil $m$ and the coil itself to the storage battery, from here over contact 5 and switch $p$ to the right-hand arm of the switch $u$, and thence to the negative pole of the dynamo.

Second. For the lamp-circuit: from the positive pole of the dynamo $d$ and the left-hand arm of switch $u$ to the point 1, over $i$ and $h$ to the point 2, then over contact $x$ to the resistance $y$ to contact $k$, from the same through lamp-circuit $l$, and again back through the right-hand arm of the switch $u$ to the negative pole of the dynamo $d$.

Third. For the shunt: from the positive brush of the dynamo $d$ to the left-hand arm of the switch $u$, from there over the point 1 and shunt $n$ through the regulating device $o$, hereinafter described, then over the fixed contact 46 to contact-piece 47 of the lever-arm $t$ and over the fixed contact-piece 48 and the first arm of the switch $u$ to the negative brush of the dynamo.

As the difference of the magnetic forces of the coils $b$ and $f$ controls the core $e$, the electromotive force of the dynamo—i. e., the speed of the train—does not alone control the instant of switching in the dynamo, as the same occurs somewhat sooner or later, according as the storage battery has been more or less discharged.

The regulating device $o$ of the shunt is called into action when the train moves at a greater speed than the normal. The voltmeter-like coil $r$ sucks in the iron core $s$ and switches, by the assistance of the lever $t$, gradually with the increasing number of rotations the resistance $q'\ q^2\ q^3$, &c., into the shunt.

It is obvious that the differential switch $a$ and the regulating device $o$ can be constructed in many different forms. For the proper understanding of the invention the operation of the apparatus and the switching of the same will be described, and then a few constructions of the two switching devices.

The automatic switch $m$, which is located in the circuit of the storage battery, consists of a coil which draws in an iron core against the tension of the spring S and which is connected with a contact $z$, but connected with the point 2 only when the iron core forms contact with the point 3. This is the case when the storage battery has to be charged during the motion of the train from the dynamo. In that case the current flows through the coil. When the storage battery is fully charged, the charging-current reaches the minimum—tension and load are constant. The coil cannot therefore draw in the core any more, so that it leaves the point 3 and forms contact with point 4. At this point the storage battery is automatically switched out, notwithstanding that the coil is still in connection with the contact $z$, inasmuch as the contact-piece 52 is not in contact with $x$, so that the circuit is interrupted and the storage battery switched out of action. When the train stops or when the speed is less than normal, the core $e$ is attracted by the coil $b$ and the lever $g$ produces the switching-out of the dynamo between $h$ and $i$ as the contact-piece 50 leaves $h$, while $y$ is switched in between $x$ and $k$ as the contact-piece 51 connects $x$ and $k$. Simultaneously the contact-piece 52 forms contact with $x$ and $z$, so that the storage battery supplies the lamps as the current passes in the following circuit: from the positive pole of the storage battery $c$ through the coil of the switch $m$, through the iron core of this coil over $z$, 52, $x$, 51, $k$, and through the lighting-circuit, then over the switch $p$ and contact 5 to the negative pole of the storage battery. As the current passes through the coil $m$ the core of the same forms contact with the point 3, so that during the starting of the train and up to its normal speed the storage battery is switched in and can be charged while the lamps receive current without interruption.

The switch $p$ acts as the main switch, and its mechanical operation can be readily perceived from Figs. 1, 3, and 5. During the day, when no lighting-current is required, the main switch $p$ is operated by hand, so that the circuit of the storage battery is opened. Simultaneously the dynamo is switched out in the following manner: The collector 7, Figs. 3 and 5, is connected by a fulcrumed elbow-lever $p'$ and connecting-rods 8 with the brush-carriers, so that by the turning of the main switch $p$ the brushes 9 are lifted away from the collector, so that thereby simultaneously the dynamo and storage battery are switched out.

A second switch device, which is shown in Figs. 2 and 4, serves for the purpose of keeping the current in the same direction independent of the direction of motion of the train, so that it flows from the dynamo to the shunt and the storage battery always in the same direction. This switch device consists of a governing device for the automatic shifting of the arm 10, said governing device consisting, for instance, of a small centrifugal governor 11 and an ordinary switch $u$, provided with a shifting lever 13. The function of the switch $u$ is shown in Fig. 1 and has been before described. Its mechanical automatic regulation is accomplished in the following manner: The governor is connected by the ring 14 with the armature-shaft 15 of the dynamo $d$ and provided at its opposite end with a ring 16, free on the shaft. When the train is in motion, so that the armature-shaft rotates, the centrifugal governor is called into action. By the arm 10 the lever-arm 13 of the switch $u$ is moved, so that the current passes through the storage battery, shunt, and the resistance in one definite direction. If the train were moved in the opposite direction, the switch $u$ would be moved by the elastic arm 10 over to the opposite side, so that the current of the dynamo through the storage battery, lighting devices, and shunt will retain the same direction. While the train is in motion, the elastic tongue 10 is always retained by the governor in retracted position, so that the switch $u$ and its arm 13 are not actuated. As a counterbalance toward the centrifugal motion of the governor is arranged a helical spring 54, which returns the governor into its position of rest when the train arrives at a full stop. The helical spring is so arranged that it has a tendency to reduce the distance of the two weights of the governor from each other or that it tends to increase the distance of the rings 14 and 16 from each other.

Having thus described my invention, I claim as new and desire to secure by Letters Patent—

1. An apparatus for the electric illumination of railway-cars, consisting of a storage battery located below the car-body, a dynamo geared to an axle of the car, a switch consisting of a coil connected with said battery, and an oppositely-arranged coil connected with said dynamo, a core influenced by both coils, a pivoted switch-arm actuated by said core, contacts controlled by said switch-arm and connected with the dynamo and storage battery, lamps, a lamp-circuit connected with said contacts and with the dynamo and storage battery, and a resistance between certain of said contacts, said contacts and switch-arm being so arranged as to switch the storage battery into the lamp-circuit when the dynamo is not operated, or operated below normal speed, and to switch said dynamo and said resistance simultaneously into the circuit when operated at normal speed, substantially as set forth.

2. In an apparatus for the electric illumination of railway-cars, a dynamo, a storage battery, lamps, contacts connected with said dynamo, storage battery, and lamps, a switch device controlled by said dynamo and battery and movable over said contacts, a switch comprising a coil in circuit with said battery, and a core actuated by said coil, and connections controlled by said last-named switch whereby a battery-circuit is established through the lamps and one of said contacts, without interruption, upon the cutting out of the dynamo by said switch, substantially as set forth.

3. In an apparatus for the electric illumination of railway-cars, a dynamo, connected with the car-axle, a reversing-switch in circuit with said dynamo and provided with a projecting arm, a centrifugal governor connected with the car-axle and provided at one end with a shiftable ring, and an elastic tongue on said ring, adapted to engage said arm, substantially as set forth.

In testimony that I claim the foregoing as my invention I have signed my name in presence of two subscribing witnesses.

ALFRED ZEHDEN.

Witnesses:
HENRY HASPER,
WOLDEMAR HAUPT.